(12) United States Patent
Maruyama

(10) Patent No.: US 9,180,396 B2
(45) Date of Patent: Nov. 10, 2015

(54) AIR CLEANER

(71) Applicant: TOYOTA BOSHOKU KABUSHIKI KAISHA, Aichi-ken (JP)

(72) Inventor: Kazushige Maruyama, Nagoya (JP)

(73) Assignee: TOYOTA BOSHOKU KABUSHIKI KAISHA, Aichi-Ken ( * ) Notice: Subject to any disclaimer, the term of this patent is extended or adjusted under 35 U.S.C. 154(b) by 44 days.

(21) Appl. No.: 14/189,241

(22) Filed: Feb. 25, 2014

(65) Prior Publication Data
US 2014/0260132 A1   Sep. 18, 2014

(30) Foreign Application Priority Data
Mar. 13, 2013   (JP) .................. 2013-050634

(51) Int. Cl.
| | | |
|---|---|---|
| *F02M 35/02* | (2006.01) |
| *B01D 46/00* | (2006.01) |
| *F02M 35/024* | (2006.01) |
| *B01D 46/52* | (2006.01) |
| *B01D 46/10* | (2006.01) |

(52) U.S. Cl.
CPC ............ *B01D 46/0041* (2013.01); *B01D 46/10* (2013.01); *B01D 46/521* (2013.01); *F02M 35/02* (2013.01); *F02M 35/0245* (2013.01); *F02M 35/02433* (2013.01)

(58) Field of Classification Search
CPC .. B01D 50/00; B01D 50/002; F02M 25/0836; F02M 25/089; F02M 35/02
USPC ............. 55/385.3, 320, 486, 495, 521
See application file for complete search history.

(56) References Cited

U.S. PATENT DOCUMENTS

| | | | | |
|---|---|---|---|---|
| 8,062,397 B2 * | 11/2011 | Lin et al. ................. 55/320 |
| 8,419,834 B2 * | 4/2013 | Rotter et al. ............. 95/268 |
| 8,562,706 B2 * | 10/2013 | Siber ..................... 55/385.3 |
| 2006/0109670 A1 * | 5/2006 | Kitamura et al. ............. 362/475 |
| 2008/0110146 A1 * | 5/2008 | Germain et al. ............ 55/385.3 |
| 2012/0017764 A1 * | 1/2012 | Lee et al. ................. 96/397 |

FOREIGN PATENT DOCUMENTS

JP   59-107967   7/1984

* cited by examiner

*Primary Examiner* — Duane Smith
*Assistant Examiner* — Minh-Chau Pham
(74) *Attorney, Agent, or Firm* — Greenblum & Bernstein, P.L.C.

(57) ABSTRACT

An air cleaner includes a filter element, which includes a sheet-like filter material having pleats, a housing accommodating the filter element, and an inlet and an outlet, which are provided on the wall of the housing. The wall of the housing includes a first wall portion and a second wall portion, which face each other and are each arranged on one of the ends of the filter element in the direction in which ridges of the pleats extend. A guide piece, which extends along the ridges, is provided in the housing between the inlet and the filter element. The guide piece forms a clearance between the guide piece and the second wall portion, and guides the air that has passed through the clearance toward the first wall portion.

7 Claims, 3 Drawing Sheets

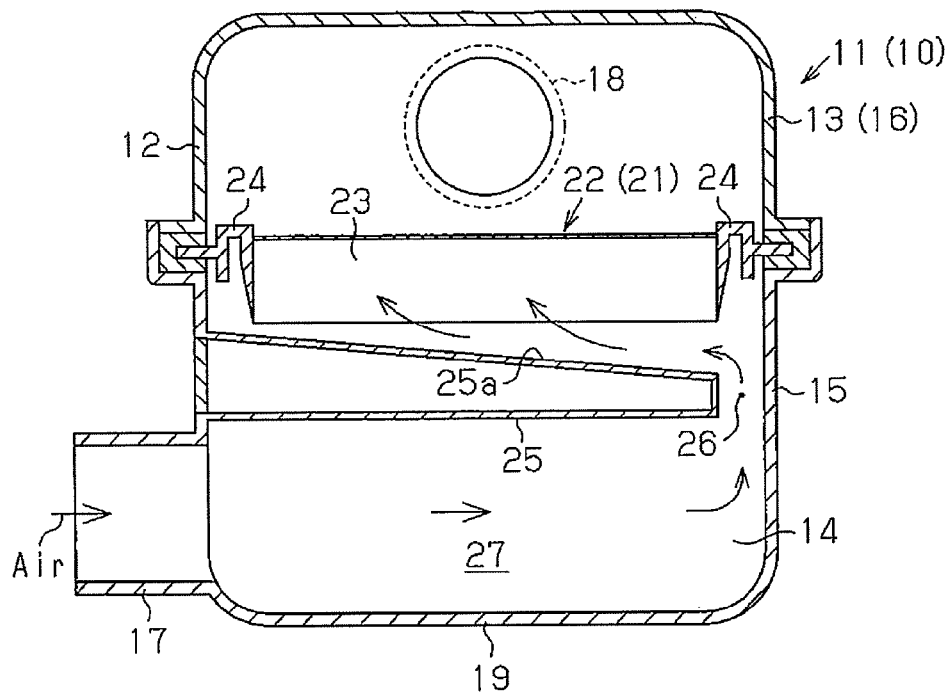
Fig.2
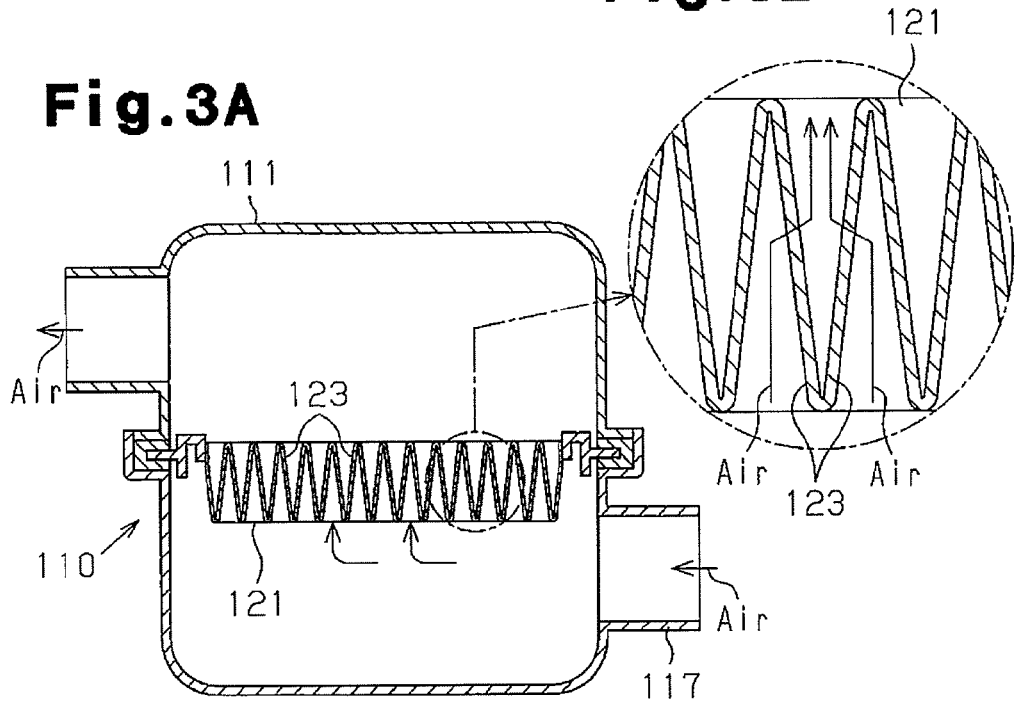
Fig.3A
Fig.3B

AIR CLEANER

BACKGROUND OF THE INVENTION

The present invention relates to an air cleaner for filtering air drawn into an engine.

Air cleaners are required to have excellent dust trapping performance. Air cleaners are also required to have reduced airflow resistance because it is necessary to reduce resistance that occurs with intake (intake resistance) to improve engine output.

In the air cleaner disclosed in, for example, Japanese Laid-Open Utility Model Publication No. 59-107967, pleat sections configuring pleats of a filter element extend along the flow of air flowing into a housing through an inlet. In other words, the inlet is formed in the housing at a position where the inlet allows air to flow in the direction of the ridges of the pleats.

Thus, in the above-mentioned air cleaner, the air that flowed into the housing through the inlet does not strike the pleat sections perpendicularly, but flows along the pleat sections. The air passes through the pleat sections without significantly changing the flow direction. As a result, the airflow resistance of the air cleaner is reduced, and the intake resistance of the engine is reduced, thus improving the engine output.

SUMMARY OF THE INVENTION

In the air cleaner disclosed in Japanese Laid-Open Utility Model Publication No. 59-107967, the position of the inlet in the housing is restricted in order to let air to flow in the direction of the ridges of the pleats. Thus, for example, flexibility in design of the housing and in mounting position of the air cleaner in an engine compartment is lowered.

Accordingly, it is an objective of the present invention to provide an air cleaner that has low restriction on the position of an inlet in a housing, and has high design flexibility.

To achieve the foregoing objective, and in accordance with one aspect of the present invention, an air cleaner is provided that includes a filter element including a sheet-like filter material having a plurality of pleats, a housing accommodating the filter element, and an inlet and an outlet provided on a wall of the housing. The air cleaner filters air that enters the housing through the inlet with the filter element and discharges the filtered air from the outlet. The wall of the housing includes a first wall portion and a second wall portion, which face each other and are each arranged on one of the ends of the filter element in the direction in which ridges of the pleats extend. A guide piece, which extends along the ridges, is provided in the housing between the inlet and the filter element. The guide piece forms a clearance between the guide piece and the second wall portion and guides air that has passed through the clearance toward the first wall portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a cross-sectional view illustrating the air cleaner of FIG. 1A;

FIG. 3A is a cross-sectional view illustrating an air cleaner according to a comparative example;

FIG. 3B is an enlarged partial cross-sectional view of FIG. 3A;

DETAILED DESCRIPTION OF THE PREFERRED EMBODIMENTS

An air cleaner 10 according to one embodiment will now be described with reference to FIGS. 1A to 4.

The air cleaner 10 of the present embodiment is provided in an intake passage of a vehicle engine, and filters air that is drawn into the engine through the intake passage. Subjects of separation from air by filtration include dust having relatively small particle diameters such as carbon dust contained in automobile exhaust gas besides dust having relatively large particle diameters that typically floats in the air.

Figure 1A:
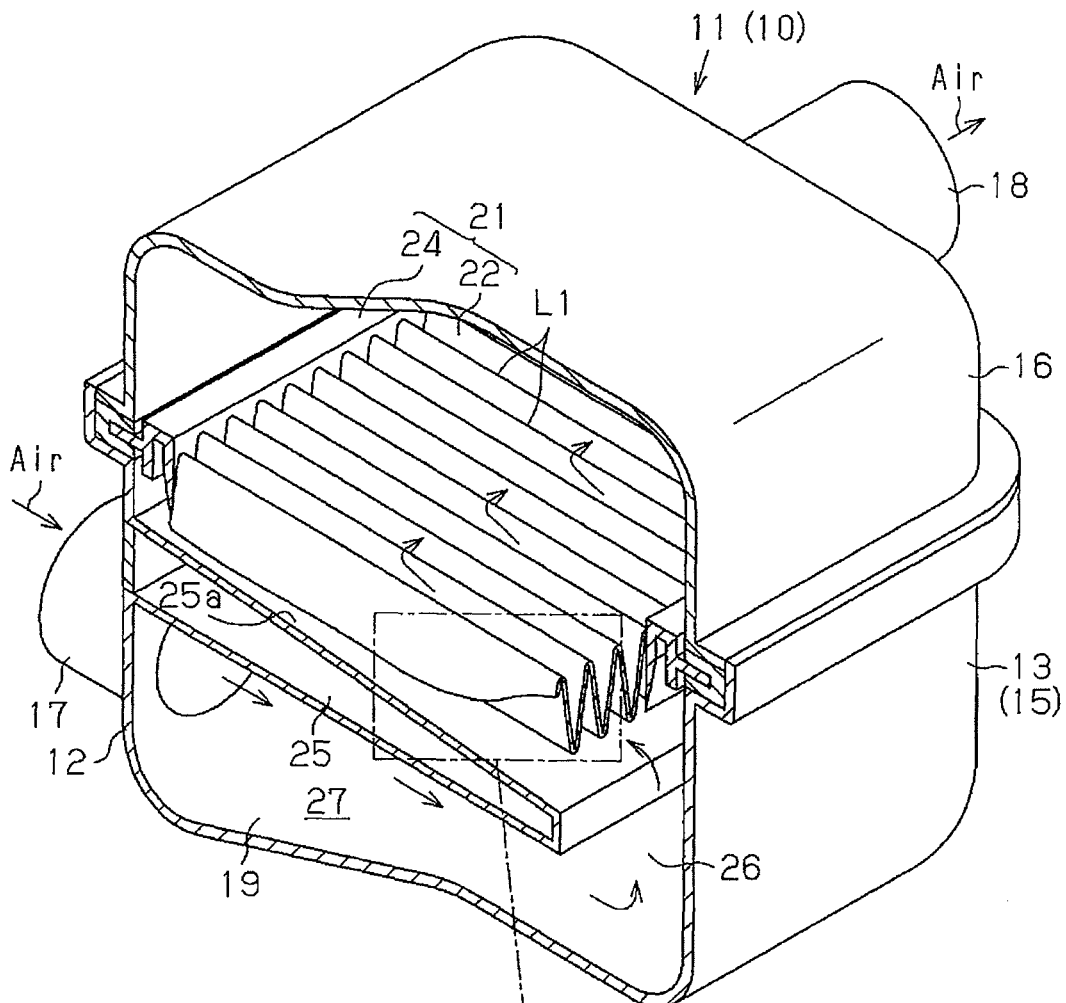
FIG. 1A is a partial perspective view, with a part cut away, illustrating an air cleaner according to one embodiment of the present invention.

As shown in FIGS. 1A and 2, an outer shell of the air cleaner 10 is configured by a housing 11 made of plastic. The housing 11 includes a case 15 and a cap 16, which is located on top of the case 15. A tubular inlet 17 projects from the case 15 to allow air containing dust to flow into the housing 11. A tubular outlet 18 projects from the cap 16 to allow the air inside the housing 11 to flow out. The inlet 17, an internal space of the housing 11, and the outlet 18 form a flow passage of air in the air cleaner 10. An inlet duct, which is open to the atmosphere, is connected to the inlet 17. An outlet duct, which is arranged between the outlet 18 and an intake end of the engine, is connected to the outlet 18. In the air cleaner 10 of the present embodiment, the flow passage of air is formed such that the inlet 17 is located at an upstream end and the outlet 18 is located at a downstream end.

A filter element 21 is arranged in the housing 11 between the inlet 17 and the outlet 18. The main part of the filter element 21 is formed by pleating a sheet-like filter material 22 made of filter paper. That is, in the filter element 21, the sheet-like filter material 22 is folded by a certain width while alternating folding directions. In the pleated filter material 22, parts between the adjacent folding lines will be referred to as pleat sections 23. Further, each folding line between the adjacent pleat sections 23 will be referred to as a ridge L1 of the pleat. Both ends of the filter material 22 in the direction of the ridges L1 are closed.

A sealing member 24 is attached to the peripheral portion of the pleated filter material 22 in a state that the sealing member 24 surrounds the filter material 22. The sealing member 24 is formed of an elastic material such as rubber. The filter element 21 is sandwiched by the case 15 and the cap 16 at the sealing member 24 from the upper side and the lower side of the sealing member 24.

The wall of the housing 11 includes a first wall portion 12 and a second wall portion 13, which face each other and are each arranged on one of the ends of the pleats in the direction of the ridges L1 of the pleats, and two side wall portions 14, which face each other and are each arranged on one of the sides in the arrangement direction of the pleat sections 23. In the present embodiment, the inlet 17 is provided on the first wall portion 12, and the outlet 18 is provided on one of the pair of side wall portions 14.

A guide piece 25 is provided in the housing 11 between the inlet 17 and the filter element 21. The guide piece 25 extends along the ridges L1 to a position close to the second wall portion 13. A clearance 26 is formed between the guide piece 25 and the second wall portion 13. In the present embodiment, the guide piece 25 projects from the first wall portion 12 of the case 15 toward the second wall portion 13, and is formed integrally with the case 15. The guide piece 25 is hollow. The distance between the guide piece 25 and the second wall portion 13 corresponds to the width of the clearance 26. The width of the clearance 26 is set to be constant in the folding direction of the pleats (arrangement direction of the pleat sections 23). Furthermore, the guide piece 25 contacts or is close to the side wall portions 14. The guide piece 25 introduces the air that has passed through the clearance 26 toward the first wall portion 12. A surface 25a of the guide piece 25 faces the filter element 21. The surface 25a is inclined such that the distance between the surface 25a and the filter element 21 decreases as the distance from the clearance 26 increases.

Furthermore, a silencing air chamber 27 is formed in the housing 11 between the guide piece 25 and the inlet 17, and between the guide piece 25 and a bottom wall portion 19 of the case 15.

Operation of the air cleaner 10 configured as described above will now be described.

As shown in FIGS. 1A and 2, air containing dust flows from the outside of the housing 11 into the air chamber 27 in the housing 11 through the inlet 17. The air chamber 27 is a space upstream of the guide piece 25. The dust contained in the air is trapped by the filter material 22 when the air passes through the filter material 22 of the filter element 21. The cleaned air, from which dust has been removed, is drawn into a space downstream of the filter element 21 in the housing 11, and into the engine through the outlet 18.

An air cleaner 110 configured as illustrated in FIG. 3A will now be considered as a comparative example. According to the air cleaner 110 of the comparative example, a guide piece is not provided in a housing 111. Moreover, pleats are not formed in the direction of the flow of air that enters through an inlet 117. In the comparative example, when the air passes through pleat sections 123, the flow direction is changed to a direction perpendicular to the pleat sections 123, or a direction close to perpendicular as shown in FIG. 3B. In this manner, the airflow resistance that occurs at a filter element 121 is increased since the direction of flow is changed to a significantly different direction when air passes through the pleat sections 123.

In contrast, in the present embodiment, the air that has flowed into the air chamber 27 of the housing 11 through the inlet 17 passes the clearance 26 between the guide piece 25 and the second wall portion 13 as shown in FIGS. 1A and 2. Most part of the air that has flowed into the space between the guide piece 25 and the filter element 21 through the clearance 26 flows toward the first wall portion 12 along the surface 25a of the guide piece 25 that faces the filter element 21. The flow direction of the air is substantially the same as the direction in which extend the ridges L1 of the pleats of the filter element 21.

Figure 1B:
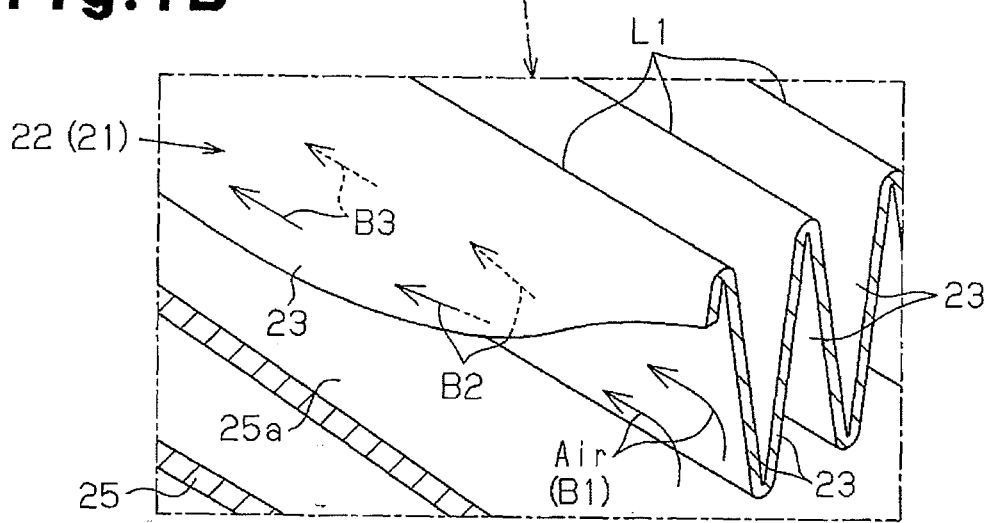
FIG. 1B is an enlarged partial perspective view of FIG. 1A.

The air passes through the pleat sections 23 during the process of flowing along the ridges L1 as shown in FIG. 1B. At this time, the flow of air is prevented from significantly changing the direction with respect to the pleat sections 23, which configure the pleats. In FIG. 1B, arrows B1 indicate the air before passing through the pleat sections 23, arrows B2 indicate the air when passing through the pleat sections 23, and arrows B3 indicate the air after having passed through the pleat sections 23. As shown by arrows B1, B3, the air flows substantially along the ridges L1 both before and after passing through the pleat sections 23. Also, when the air passes through the pleat sections 23, the air only slightly changes the flow direction from the immediately prior state as shown by arrows B2. In FIG. 1B, two kinds of airflows are shown. Arrows B1, B2, B3 on the near side in FIG. 1B show the air that flows along the nearest pleat section 23 illustrated with a part cut away and passes through the pleat section 23. Arrow B2 on the near side, which is formed by combining a broken section and a solid section, shows the air passing through the nearest pleat section 23. That is, the broken sections of arrow B2 indicates the air before passing through the nearest pleat section 23, and the solid sections of arrow B2 indicates the air after passing through the nearest pleat section 23.

One of each pair of arrows B1, B2, B3 at the far side in FIG. 1B indicates the air that flows along the pleat section 23 at the far side shown without being cut away and passes through the pleat section 23.

The resistance that occurs when the air passes through the pleat sections 23 as described above is less than the resistance when the air passes through the pleat sections 23 perpendicularly or in a similar state in the comparative example.

Furthermore, in the present embodiment, the surface 25a of the guide piece 25 that faces the filter element 21 is inclined such that the distance between the surface 25a and the filter element 21 decreases as the distance from the clearance 26 increases. This allows part of the air to approach the filter element 21 as the air flows toward the first wall portion 12 along the surface 25a of the guide piece 25. Thus, part of the air that has passed through the clearance 26 flows along the ridges L1 of the pleats in the vicinity of the filter element 21 at not only portions close to the second wall portion 13 but also at portions away from the second wall portion 13, and passes through the pleat sections 23 without significantly changing the flow direction.

Figure 4:
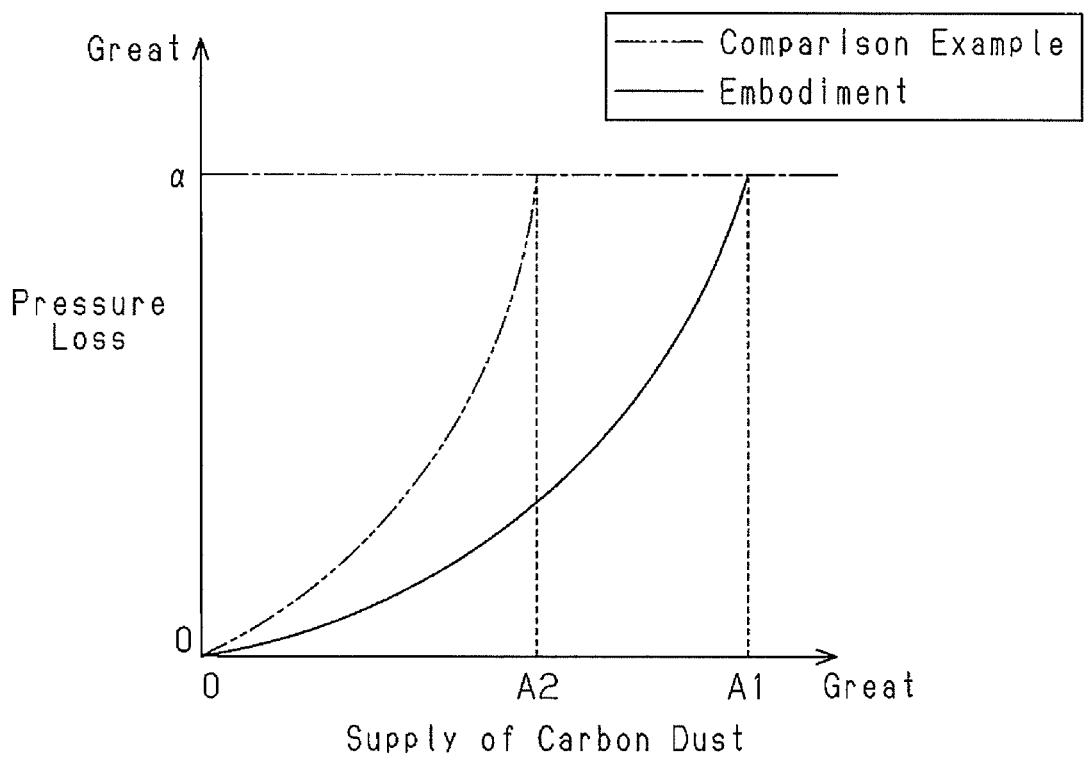
FIG. 4 is a graph showing the relationship between supply of carbon dust and pressure loss of the air cleaner according to the present embodiment and the comparative example.

FIG. 4 shows the tendency of the relationship between the cumulative value of the supply of dust, which is carbon dust in this embodiment, and the pressure loss caused by the filter element 21 when supplying (mixing) carbon dust to air that flows into the air cleaner 10. The cumulative value of the supply of carbon dust corresponds to the amount of carbon dust trapped and accumulated in the filter element 21, and corresponds to the time that has elapsed from when starting to use the filter element 21.

As apparent from FIG. 4, as the supply of carbon dust is increased, the pressure loss is increased in both the present embodiment and the comparative example. Furthermore, in the present embodiment, a supply of carbon dust A1 that can be supplied before the pressure loss reaches a predetermined value a is greater than a supply of carbon dust A2 in the comparative example. This is because, as described above, the resistance that occurs when the air passes through the pleat sections 23 is small in the air cleaner of the present embodiment as compared to that in the comparative example. That is, the greater the airflow resistance when the air passes through the pleat sections 23 is and the greater the accumulated amount of carbon dust becomes, the greater the pressure loss will be. Since the airflow resistance is small in the present embodiment as compared to the comparative example, the pressure loss caused by the airflow resistance is reduced. This increases the amount of carbon dust that can be accumulated before the pressure loss reaches the value a.

As described above, the air is allowed to change the flow direction to a direction along the ridges L1 of the pleats by the guide piece 25, which is provided upstream of the filter element 21 in the housing 11. According to the air cleaner of the present embodiment, unlike the air cleaner disclosed in Japanese Laid-Open Utility Model Publication No. 59-107967, the flow direction of air is not changed to a direction along the ridges L1 of the pleats by the inlet 17. Thus, the position of the inlet 17 in the housing 11 is more freely set. For this reason, although the inlet 17 is provided on the first wall portion 12 in the present embodiment, the inlet 17 may be provided on another wall of the housing 11 such as the second wall portion 13, the side wall portions 14, and the bottom wall portion 19 on condition that the inlet 17 is located upstream of the guide piece 25. For the same reason, the angle of the inlet 17 (orientation of the inlet 17) with respect to the wall of the housing 11 is also more freely set.

In a case where intake noise of the engine is transmitted to the air cleaner 10 through the inlet 17, the inlet 17 functions as a resonance tube, and the air chamber 27 operates as a resonance chamber. That is, the inlet 17 and the air chamber 27 operate as a Helmholtz resonator. Thus, the inlet 17 and the air chamber 27 resonate with a predetermined frequency component (resonance frequency) of the noise, which reduces the sound pressure level of the noise at the resonance frequency. As a result, intake noise of the engine is attenuated.

The present embodiment as described above has the following advantages.

(1) The guide piece 25 extending along the ridges L1 of the pleats is provided in the housing 11 between the inlet 17 and the filter element 21. The guide piece 25 forms the clearance 26 between the guide piece 25 and the second wall portion 13, and guides the air that has passed through the clearance 26 toward the first wall portion 12.

Thus, the flow direction of air can be changed to a direction along the ridges L1 of the pleats by the guide piece 25. Furthermore, since the position of the inlet 17 in the housing 11 is freely set, the flexibility in design of the housing 11 and in the assembly position of the air cleaner 10 in the engine compartment is improved.

Also, air passes through the pleat sections 23 without significantly changing the flow direction of air. Thus, the resistance when the air passes through the pleat sections 23 is reduced. This increases the carbon dust trapping capacity before the pressure loss reaches the predetermined value a.

In the comparative example shown in FIGS. 3A and 3B, the size of the filter element 121 needs to be increased to increase the carbon dust trapping capacity of the carbon dust. This increases the costs of the air cleaner 110. In contrast, since the carbon dust trapping capacity is increased as described above in the present embodiment, the filter element 21 is reduced in size, and costs are reduced as compared to the comparative example.

(2) The surface 25a of the guide piece 25 facing the filter element 21 is inclined such that the distance between the surface 25a and the filter element 21 decreases as the distance from the clearance 26 increases.

Thus, even at a position away from the clearance 26 toward the first wall portion 12, the air that has passed through the clearance 26 flows along the ridges L1 of the pleats in the vicinity of the pleat sections 23. The resistance caused when air passes through the pleat sections 23 is reduced in a wide range in the direction along the ridges L1 of the filter element 21.

(3) The guide piece 25 is formed integrally with the first wall portion 12 of the case 15.

Thus, the guide piece 25 is easily formed as part of the housing 11. In the present embodiment, the guide piece 25 and the case 15 are formed of plastic, and the guide piece 25 is molded together with the case 15 when molding the case 15.

(4) The silencing air chamber 27 is formed between the guide piece 25 and the inlet 17 of the housing 11, and between the guide piece 25 and the bottom wall portion 19 of the case 15.

Thus, the intake noise transmitted to the air cleaner 10 through the inlet 17 is attenuated by resonant action of the inlet 17 and the air chamber 27.

Moreover, since there are few restrictions in the position and orientation of the inlet 17, the volume of the air chamber 27 is freely designed, and noise with a desired frequency is effectively reduced.

The above described embodiment may be modified as follows.

Figure 5:
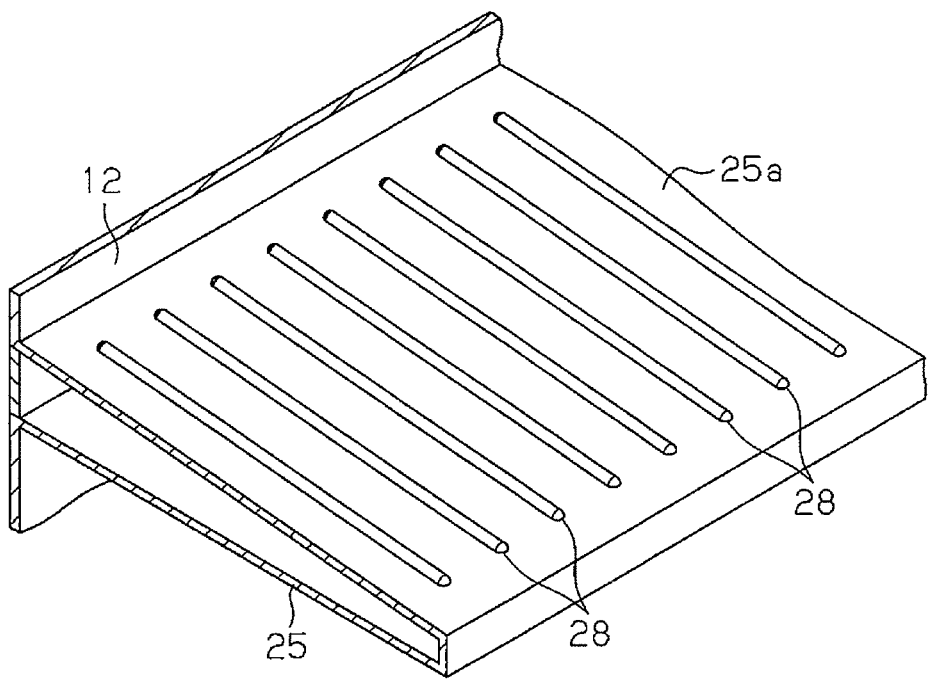
FIG. 5 is a partial perspective view illustrating a modification of a guide piece.

Projecting ribs 28, which extend in the direction along the ridges L1 of the pleats, may be provided on the surface 25a of the guide piece 25 facing the filter element 21 as shown in FIG. 5. In this case, the air that has passed through the clearance 26 is allowed to flow along the ribs 28 in addition to the surface 25a, and the flow direction of air is more effectively changed to the direction along the ridges L1.

The guide piece 25 may be provided at a position separate from the first wall portion 12.

The surface 25a of the guide piece 25 that faces the filter element 21 may be linearly inclined at the same angle at any positions in the direction along the ridges L1. The surface 25a may be curved to form a convexity or concavity as long as the distance between the guide piece 25 and the filter element 21 as a whole decreases as the distance from the clearance 26 is increased.

As long as the air that has passed through the clearance 26 is guided toward the first wall portion 12 along the ridges L1 of the pleats, the surface 25a of the guide piece 25 may be formed to be parallel to the filter element 21.

The guide piece 25 may be configured as a separate member from the case 15. In this case, the guide piece 25 may be hollow or solid.

As the filter material 22, a filter formed of a nonwoven fabric may be used instead of the filter paper.

Therefore, the present examples and embodiments are to be considered as illustrative and not restrictive and the invention is not to be limited to the details given herein, but may be modified within the scope and equivalence of the appended claims.

What is claimed is:

1. An air cleaner comprising a filter element including a sheet-like filter material having a plurality of pleats, a housing accommodating the filter element, and an inlet and an outlet provided on a wall of the housing, wherein the air cleaner filters air that enters the housing through the inlet with the filter element and discharges the filtered air from the outlet, the wall of the housing includes a first wall portion and a second wall portion, which face each other and are each arranged on one of the ends of the filter element in the direction in which ridges of the pleats extend, a guide piece, which extends along the ridges, is provided in the housing between the inlet and the filter element, and the guide piece forms a clearance between the guide piece and the second wall portion and guides air that has passed through the clearance toward the first wall portion.

2. The air cleaner according to claim 1, wherein a surface of the guide piece that faces the filter element is inclined such that a distance between the surface and the filter element decreases as the distance from the clearance increases.

3. The air cleaner according to claim 1, wherein the guide piece includes a plurality of projection ribs on a surface of the guide piece that extend along the direction in which the ridges of the pleats extend.

4. The air cleaner according to claim 2, wherein the guide piece includes a plurality of projection ribs on the surface of the guide piece that extend along the direction in which the ridges of the pleats extend.

5. The air cleaner according to claim 1, wherein the guide piece is hollow.

6. The air cleaner according to claim 1, wherein
   the guide piece includes a surface extending from the first wall portion to the clearance,
   the surface faces the filter element and is arranged at a distance away from the filter element, and
   the surface is inclined such that the distance between the surface and the filter element decreases as the distance from the clearance increases.

7. The air cleaner according to claim 6, wherein the guide piece includes a plurality of projection ribs on the surface of the guide piece that extend along the direction in which the ridges of the pleats extend.

* * * * *